METHOD AND APPARATUS FOR GROUND-WAVE TRANSMISSION AND RECEPTION OF RADIO WAVES

Filed Sept. 30, 1950 3 Sheets-Sheet 1

INVENTOR.
William M. Barret
BY John B. Brady
ATTORNEY

Aug. 25, 1959 W. M. BARRET 2,901,687
METHOD AND APPARATUS FOR GROUND-WAVE TRANSMISSION
AND RECEPTION OF RADIO WAVES
Filed Sept. 30, 1950 3 Sheets-Sheet 2

INVENTOR.
William M. Barret
BY John B. Brady
ATTORNEY

Aug. 25, 1959 | W. M. BARRET | 2,901,687

METHOD AND APPARATUS FOR GROUND-WAVE TRANSMISSION AND RECEPTION OF RADIO WAVES

Filed Sept. 30, 1950 | 3 Sheets-Sheet 3

INVENTOR.
William M. Barret
BY John B. Brady
ATTORNEY

United States Patent Office
2,901,687
Patented Aug. 25, 1959

2,901,687

METHOD AND APPARATUS FOR GROUND-WAVE TRANSMISSION AND RECEPTION OF RADIO WAVES

William M. Barret, Shreveport, La., assignor to Engineering Research Corporation, Shreveport, La., a corporation of Louisiana Application September 30, 1950, Serial No. 187,792
9 Claims. (Cl. 324—1)

This invention relates to antenna systems, and particularly to methods and means for obtaining directive transmission or reception of radio waves through the earth.

One of the severest obstacles encountered in the art of electrical prospecting with radio waves has been the enormous reflection losses suffered by the waves in passing downward and upward through the air-earth boundary. The reflection losses may be overcome with the system embodied in the instant invention, inasmuch as the wave energy is introduced directly into the earth and received directly therefrom, without the necessity of crossing the air-earth boundary in either direction. Moreover, the improved system is adapted to the directive transmission or reception of the wave energy through the earth. These advances make it possible to explore the earth with greater effectiveness than heretofore possible with the radio methods of exploration.

Furthermore, the propagation and reception of radio signals by ground-wave transmission are frequently of great importance in the radio art. And since the present invention provides a system that is inherently suited to the propagation of radio waves through the earth and their reception therefrom, it therefore is particularly adapted to radio signaling by ground-wave transmission. When thus applied, the transmission is unaffected by the variable and unpredictable factors that influence "sky-wave" propagation, and too, the effect of atmospheric conditions, such as static, are always minimized, and sometimes eliminated. Local electrical interference is also largely overcome. By avoiding the use of costly elevated antennas, the investment in equipment is notably less when using the herein disclosed apparatus than when conventional apparatus is employed, particularly when the comparison involves directive antenna arrays. Within the range of ground-wave transmission, radio signaling with the invention is consequently more reliable and less costly than with the means and methods presently used in the radio art.

One of the objects of the invention is, accordingly, to furnish novel and useful methods and apparatus for the effective introduction of radio waves into the earth and their reception therefrom.

Another object of the invention is to provide a directive radiating system for propagating radio waves in any desired direction into the earth, and a directive receiving system for the reception of radio waves from any desired direction in the earth.

Another object of the invention is to make available an improved prospecting system for utilizing the effective transmission of radio waves through the air-earth boundary and for taking advantage of the directive transmission and reception of the waves, so as to reveal important subsurface information through the agency of radio waves.

Another object of the invention is to provide a means for and method of exploring the earth to great depths with radio waves by controlling their directions of propagation and reception.

An additional object of the invention is to furnish an improved system for radio signaling between spaced points on or within the earth.

A further object of the invention is to make available methods and apparatus for obtaining other useful information and for serving other useful purposes for which the invention is adapted.

The principle and application of the invention will be understood from the description which follows, and the drawings appended thereto, wherein.

Figure 1:
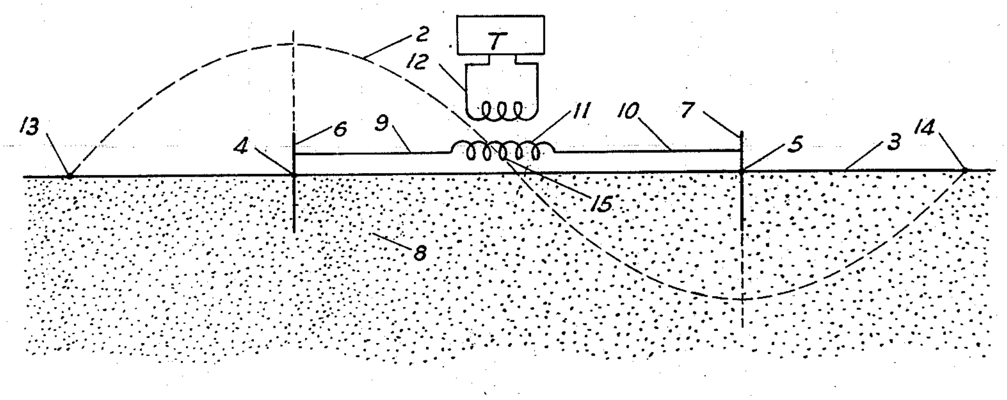
Fig. 1 is a diagrammatic representation of an arrangement used in accordance with the invention for transmitting or receiving radio waves through the earth.

Referring first to Fig. 1, there is illustrated diagrammatically therein at 2 a radio wave that is traveling along the air-earth boundary 3. If the dashed curve 2 be taken to represent the variation with distance of the amplitude of the electric vector at a given instant, then it is evident that the vector has its maximum positive amplitude at the point 4, its maximum negative amplitude at the point 5, and that the points 4 and 5 are spaced apart one-half wave length, or 180 electrical degrees. The separation in space of the points 4 and 5 on the air-earth boundary 3 will be determined by the frequency of the wave and by its velocity along the said boundary.

Also illustrated diagrammatically in Fig. 1 is a simplified form of the apparatus embodied in the invention. Here 6 and 7 denote electrodes which are firmly imbedded in the earth 8 in conductive relationship therewith and which are respectively connected by the wires 9 and 10 to the coil 11. The link coil 12 is inductively coupled to the antenna coil 11 and connected to the translation device T, which may be a transmitter or receiver.

It has been found that if the electrical length of the circuit between the electrodes 6 and 7 be made an odd half-wave multiple of the wave length in the earth 8, and if the translation device T supplies radio-frequency energy to the link coil 12, then the oscillations thereby imparted to the earth will effectively energize the earth volume involved and thus sustain the wave denoted 2. Conversely, if the translation device T were a receiver, then the wave 2 would cause a standing wave along the electrode circuit, with a current lobe at the antenna coil 11, so that current would flow in the link coil 12 and thus energize the receiver. A radio wave may therefore be transmitted directly into the earth or received directly therefrom by the mechanism described.

This means, in effect, that radio waves may be transmitted directly into the earth, or received directly therefrom, by "grounding" both the antenna and ground terminals of a transmitter or receiver in accordance with the teachings of the instant invention. The novelty of the invention will be recognized when it is remembered that in conventional radio practice never more than one of the two output terminals of a radio transmitter, and never more than one of the two input terminals of a radio receiver, are grounded to the earth, and that the other transmitter or receiver terminal is connected to an antenna that is elevated well above the earth in order to obtain an effective order of radiation or reception.

But despite the conventional teachings, experience has shown that when two earthed electrodes such as 6 and 7 are energized and spaced in accordance with Fig. 1, radio waves of equal and maximum intensity will be transmitted through the earth bidirectionally along the electrode axis, that is, to the left and to the right along a straight line connecting electrodes 6 and 7. As the length of the electrodes normally would be insignificant in relation to the wave length of the radiation involved, the electrode axis may, for simplicity, be defined as the straight line connecting the points 4 and 5 of Fig. 1. There will be substantially no radiation in either direction along a line midway between the electrodes and at right angles to the electrode axis.

It is noted in Fig. 1 that the electrode lines 9 and 10 are current fed and that the electrodes 6 and 7 are positioned at the half-wave points 4 and 5. Alternatively, the lines 9 and 10 may be voltage fed, and then the electrical length of the resonant circuit between the electrodes should be an even half-wave multiple of the wave length in the earth, with the electrodes spaced at full-wave points such as 13 and 14. It is to be understood that the wave length in the earth varies inversely with the refractive index of the earth with respect to air, and inasmuch as the refractive index of the earth is normally greater than unity, it follows that the wave length in the earth is normally less than the wave length in air.

The current-fed antenna system shown in Fig. 1 is in effect two quarter-wave elements, with the electrical midpoint 15 being at zero potential. In fact, this point may be grounded without materially affecting the radiating or receiving characteristics of the system. When the point 15 is grounded, either the electrode 6 and its connecting wire 9, or the electrode 7 and its connecting wire 10, may be removed and the system will continue to radiate or receive bidirectionally, though usually with somewhat less effectiveness. This is equivalent to the arrangement illustrated diagrammatically in Fig. 2, where the electrical length of the current-fed circuit between the electrodes 16 and 17 is an odd quarter-wave multiple of the wave length in the earth 18.

Figures 2, 3, 4:
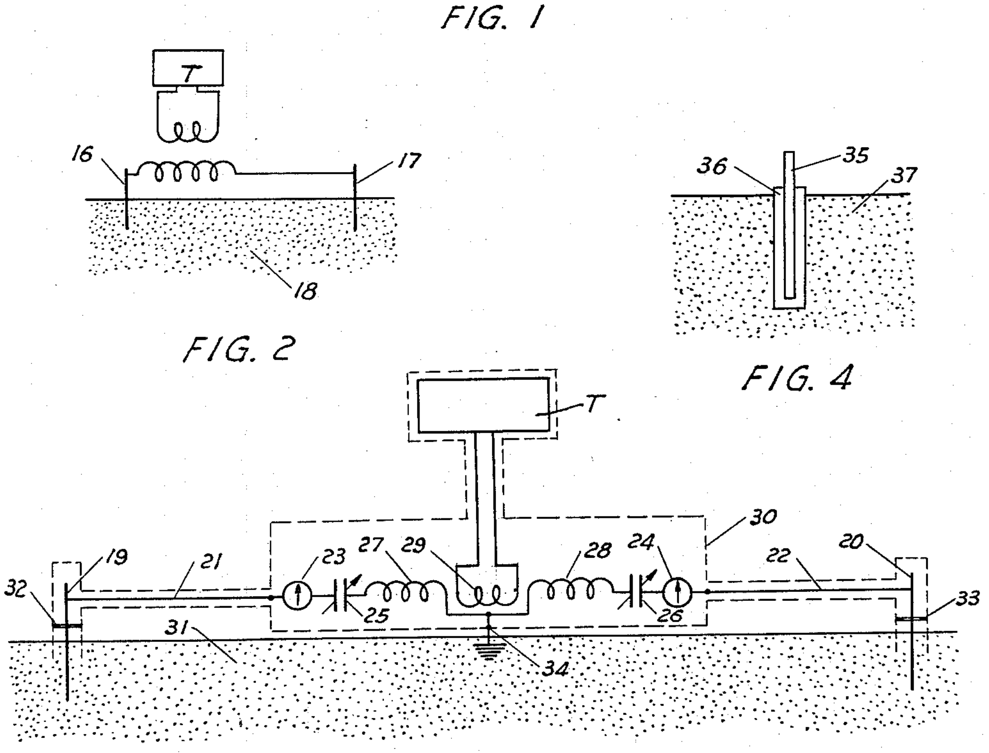
Fig. 2 illustrates schematically a modified form of the invention.
Fig. 3 is a diagrammatic drawing of the preferred form of apparatus embodied in the invention.
Fig. 4 illustrates one form of electrode for electrostatic coupling with the earth.

In Fig. 3 is shown the preferred form of antenna system, which comprises the electrodes 19 and 20, coupled respectively by the wires 21 and 22 to the current-indicating meters 23 and 24, the variable condensers 25 and 26, and the antenna coils 27 and 28. The translation device T, which may be a transmitter or receiver, is inductively coupled to the antenna coils by the link coil 29. The dashed line 30 represents shielding that surrounds all circuit elements, including the electrode lines 21 and 22 and the upper portions of the electrodes 19 and 20. The electrode shields preferably extend into the earth 31, and are provided with thin insulated rings 32 and 33, so that the shielding 30 is grounded only at 34, which is tied to the midpoint of the antenna coils 27 and 28. Electrode lines 21 and 22 may be coaxial cables or microphone cables or the like, and preferably are each one-quarter-wave resonant elements when the reactance of the variable condensers 25 and 26 substantially cancels the reactance of the inductors 27 and 28. In the preferred mode of operation, the spacing of the electrodes 19 and 20 in the earth 31 is substantially equal to one-half the operating wave length in the earth.

When radio-frequency power is furnished the link coil 29, and the tuning elements 25 and 26 are adjusted for maximum deflection of the meters 23 and 24, the electrode circuit is in resonance and waves will be propagated bidirectionally along the electrode axis as hereinbefore described. And conversely, waves arriving along the electrode axis would be detected by a receiver connected to the coil 29. When so employed, the aurally or visually indicated output of the receiver may be used instead of the resonance-indicating means 23 and 24. Inasmuch as a very slight difference of potential between the electrodes 19 and 20 is sufficient to actuate even a moderately sensitive receiver, the question of electrode spacing and tuning is not so important for receiving purposes.

The electrodes used with the invention preferably are composed of electrically conductive material, and are of sufficient length to insure good electrical contact with the earth. The invention is operative, however, when electrostatic coupling with the earth is employed. For this purpose each electrode may be made up of a core of conductive material such as 35 of Fig. 4, surrounded by dielectric material such as 36. When transmitting, radio energy from the core 35 then travels through the enclosing dielectric 36, which may have various thicknesses, and thence to the earth 37, and vice versa when receiving. With either conductive coupling or electrostatic coupling, the preferred stake electrodes may be replaced with electrodes of various forms, such as plates, cups, pipes, etc.

In Fig. 3 the tuning means included in the electrode circuit is seen to involve the variable capacitances 25 and 26. It is obvious, however, that other forms of tuning means may be employed, for example, variable inductances, or a combination of variable capacitances and variable inductances. Alternatively, instead of employing lumped variable reactances for the tuning means, the electrode circuit may be tuned to resonance by adjusting the lengths of the conductors 21 and 22. Furthermore, under some conditions, the tuning means and associated elements may be placed at the electrodes instead of at the translation device, although this generally leads to bulkier apparatus and less convenient operation.

In a particular application it was learned that optimum transmission or reception occurred along the electrode axis for a frequency of 1700 kilocycles when using the preferred antenna system of Fig. 3 provided with coaxial cables measuring 95 feet each, connected to conductive electrodes separated 145 feet in the earth. A decrease in the operating frequency required an increase in the resonant lengths of the coaxial cables and an increase in the electrode spacing in the earth, and vice versa.

The directions of maximum transmission or reception will always occur along the electrode axis when the time phase between the voltages (or currents) furnished the electrodes corresponds to the space phase between the electrodes in the earth. Thus in Fig. 1, where the phase difference between the voltages at the electrodes 6 and 7 is 180 electrical degrees and the electrodes are spaced apart one-half wave length in the earth, bidirectional maxima in transmission or reception occur along the electrode axis. However, the directions of maximum transmission or reception along the earth's surface are not restricted to those defined by the electrode axis, but may be varied in a horizontal plane through 90 degrees clockwise or counterclockwise by a proper choice of the electrode separation and/or the phase difference at the electrodes.

Figure 5:
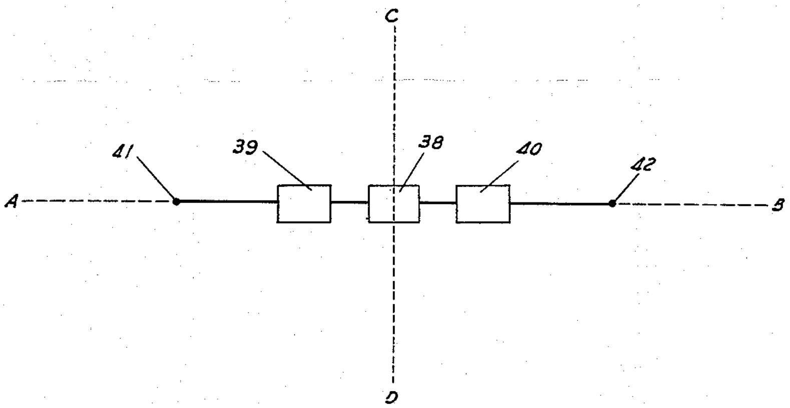
Fig. 5 is a block diagram of a form of apparatus adapted to varying the directions of maximum transmission or reception by phase-control devices.

The preferred means for varying the directions of maximum transmission or reception embodies a phase-control device in either or both of the electrode lines, as illustrated diagrammatically in Fig. 5, where 38 represents a translation device with coupling and tuning elements, and 39 and 40 are phase-control devices connected respectively to electrodes 41 and 42. Phase-control devices suitable for elements 39 and 40 may embody well-known combinations of lumped and/or variable reactances, phase-delay lines, etc., which have been fully described in the radio art.

Figure 6:
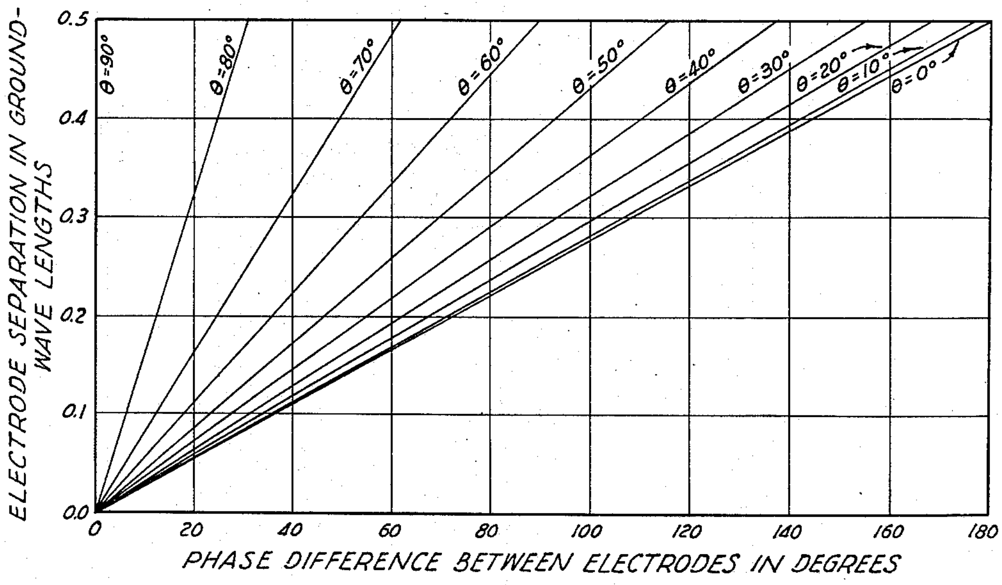
Fig. 6 illustrates graphically the relationship between the phase difference at the electrodes and the electrode separation required for various directions of maximum transmission or reception.

The relationship between the phase difference at the electrodes and the electrode separation required to produce various directions of maximum transmission or reception is displayed graphically by Fig. 6, where $\theta$ is the horizontal angle between the electrode axis and the line representing the directions of maximum transmission or reception.

For the preferred half-wave spacing of the electrodes, it is noted that maxima in transmission or reception occur along the electrode axis A—B of Fig. 5 for a phase difference of 180 degrees, as already discussed, and that the maxima are rotated to the line C—D when the phase difference is zero.

Alternatively, the phase difference at the electrodes may remain fixed and the directions of maximum transmission or reception varied by changing the electrode separation. For example, Fig. 6 shows that if the phase difference were 90 degrees, maxima in transmission or reception would occur along the electrode axis for an electrode separation of one-quarter wave length, and at an angle of 60 degrees to the electrode axis of the electrode separation were increased to one-half wave length.

When more than one combination of electrode separation and phase angle produces the same direction of maximum transmission or reception, it generally is true that the most directive pattern is obtained with the minimum permissible electrode separation.

It is obvious that the relationships expressed by Fig. 6 may readily be extrapolated beyond the preferred half-wave electrode separation and beyond the preferred phase difference of 180 degrees.

As the horizontal radiation or reception pattern varies in accordance with Fig. 6, so does the vertical radiation or reception pattern vary simultaneously therewith, and the angle $\theta$ may also be considered the vertical angle between the electrode axis and the line defining the directions of maximum transmission or reception in a vertical plane through the electrodes. The chief distinction between the radiation and reception characteristics in the horizontal and vertical planes is that the intensity of the transmitted and received waves decreases as the vertically downward and upward directions are approached.

In the preferred method of operating the invention to signal by ground-wave radio transmission, a transmitter 43 (Fig. 7) supplies radio-frequency currents phased 180 degrees apart to two electrodes such as 44 and 45 in conductive relationship with the earth and spaced apart one-half wave length, and a receiver 46 derives its input from two electrodes such as 47 and 48, also in conductive relationship with the earth and separated one-half wave length, the four electrodes being in axial alignment. Under these conditions the waves generated by the transmitter 43 are propagated by the transmitting electrodes 44 and 45 to the receiving electrodes 47 and 48, as indicated by the dashed line 49, and thence to the receiver 46.

Figure 7:
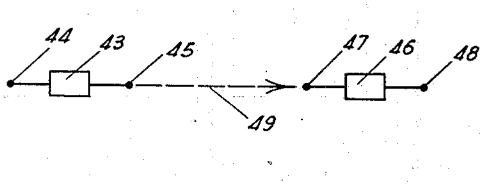
Fig. 7 is a diagrammatic drawing of the preferred arrangement used in accordance with the invention for radio signaling.
Figure 8:
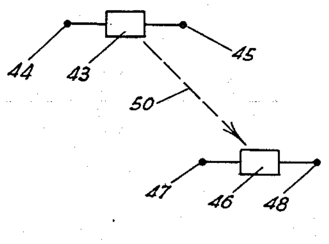
Fig. 8 is a diagrammatic drawing of an alternative arrangement used in accordance with the invention for radio signaling.

Alternatively, the apparatus of Fig. 7 may be disposed as shown in Fig. 8, and by proper adjustments of the electrode spacing and/or phasing at the transmitting means and the receiving means, radio signaling will occur therebetween as indicated by the dashed line 50. Owing to the reciprocity relation that exists between the radiation and reception patterns of the electrode system embodied in the invention, the transmitter 43 may be replaced by the receiver 46, and the propagation then will occur in directions opposite to those shown by the arrows of Figs. 7 and 8. In practice, the translation devices 43 and 46 may each represent transmitter-receiver combinations, with appropriate switching devices, so as to permit two-way radio signaling.

It will be evident to those versed in the radio art that the directivity of transmission and reception which characterizes the herein disclosed electrode system is a highly useful feature in radio signaling, for by adjusting the electrode spacing and/or phasing, a transmitting station may direct its radiation toward a particular receiving station, and it in turn may make similar adjustments which result in greatly emphasizing the sensitivity of the receiving station for signals originating at the particular transmitting station. Both the novel transmission and reception lead to a marked freedom from interfering signals. This useful feature of the invention, which permits varying the direction of maximum transmission or reception by adjusting the electrode spacing and/or phasing, will hereinafter be referred to at times as "adjusting the directivity" of the electrode system.

The invention may also be usefully applied in the geophysical art, whereby the earth is explored with radio waves which are effectively introduced into the earth and received therefrom. Radio-prospecting methods generally depend for their operation on variations in the separation (or spread) between a transmitting and receiving means, or on a like movement of both the transmitting and receiving means, or on variations in the frequency of the waves employed, or on measuring the transit time of radio waves which are propagated into the earth and returned therefrom by reflection at mineral deposits or formation boundaries. Although differing in details, the radio methods of exploration have one requirement in common, namely, radio-frequency energy must be transmitted to depth in the earth and received therefrom. The instant invention is adapted to various modes of operation, and additionally, it insures the effective transmission and reception of the radio-frequency energy.

Figure 9:
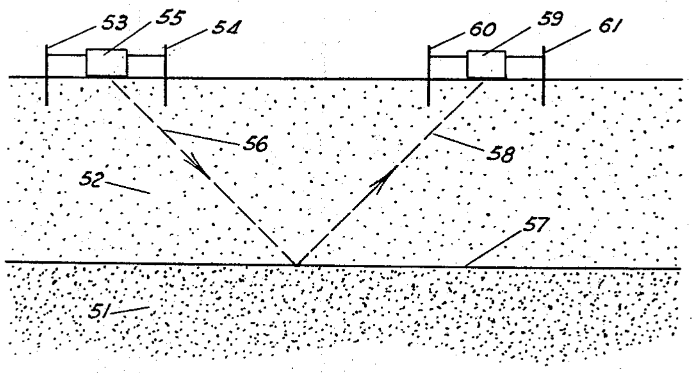
Fig. 9 is a diagrammatic representation of an arrangement used in accordance with the invention for exploring the earth with radio waves.

One method of operating the invention to transmit radio waves to depth in the earth and receive them therefrom is illustrated diagrammatically in Fig. 9, which shows a partial section of the earth comprising the medium 51 underlying the medium 52, wherein are inserted the electrodes 53 and 54, which are energized by the transmitter 55 and spaced apart and phased for maximum propagation in the direction of the line 56. On striking a mineral deposit or formation boundary such as indicated by 57, the waves are partially returned by reflection along the line 58 to the receiver 59 which is energized by the earthed electrodes 60 and 61, the directivity of which is adjusted for maximum reception of the reflected waves. It will be noted that, with this mode of operation, the earth may be explored to progressively deeper depths by increasing the spread between the transmitting and receiving means or by adjusting the directivity of the transmitting and receiving means, so as to steepen the slopes of the lines 56 and 58 and thereby emphasize the reception of energy from a selected deeper "reflector," while simultaneously discriminating against the reception of energy from other reflectors. Knowing the spread between the transmitting and receiving means, the depth of a reflector may be found from the slopes of the lines 56 and 58, which in turn may be determined from the directivity adjustments responsible for maximum signal at the receiver 59.

Figure 10:
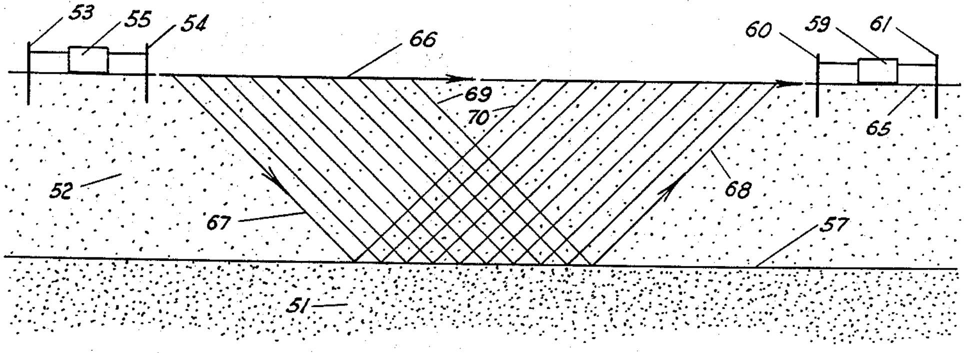
Fig. 10 is a diagrammatic representation of the preferred arrangement used in accordance with the invention for exploring the earth with radio waves.

Another method of exploring the earth with the herein disclosed invention, and one which is preferred for explorations at remote depths, is illustrated diagrammatically in Fig. 10. Here the type and disposition of the apparatus may be the same as shown in Fig. 9, but the directivity of the transmitting electrodes 53 and 54 and the directivity of the receiving electrodes 60 and 61 are respectively adjusted, in accordance with Fig. 6, for maximum transmission and reception of radio waves that travel along the air-earth interface 65, as indicated by the line 66. In view of the negligible length of the electrodes 53 and 54 in comparison with the wave length of the propagated waves, the principal radiation therefrom may be considered to travel along a line coincident with the air-earth interface, and hence, as the waves move from left to right along the earth's surface 65, "rays" progressively peel off by refraction and enter the earth along a multitude of parallel ray paths, such as the path 67, and travel downward toward a mineral deposit or formation boundary, such as 57, where the rays are partially refracted downward and partially reflected back to the earth's surface 65, and again refracted to the receiving electrodes 60 and 61. The waves 66 continue to the right in Fig. 10, where they mix with the reflected rays, such as 68, and thereby act as reference waves for clearly revealing the difference in the character of the reflected rays caused by the presence of an underground reflecting surface.

With the preferred mode of operation here described, the receiver 59 is highly effective in detecting the wave energy returned from depth, since all of the rays shown reflected by the subsurface reflector 57 arrive at the receiver 59 in time phase and space phase, and hence their cumulative action adds enormously to the intensity of the received signal. It is to be noted in this connection that the total number of reflected rays effective in actuating the receiver 59 is far greater than for the mode of operation illustrated diagrammatically in Fig. 9, and for the prior-art methods of radio exploration. Indicative of this is the effective width of the refracted ray-path section, which is bounded by the rays 67 and 69, and the effective width of the like reflected ray-path section, bounded by the rays 68 and 70. This width may, of course, be increased by moving the receiving means to the right, or it may be decreased by a movement to the left. With the instant invention the width of the effective ray-path section may at times be thousands of feet, whereas with the prior-art methods employing elevated antennas the propagation through the earth has involved but a limited number of electromagnetic rays, or at best, but a comparatively narrow bundle of rays. The wave-path mechanism here disclosed is so effective that strong signals may be received from subsurface reflectors lying at depths of the order of thousands of feet.

With the preferred mode of operation, the depth of a subsurface reflector may be determined from the spread between the transmitting and receiving means at which the first reflected energy arrives at the earth's surface, increasing spread corresponding to increasing depth.

The invention therefore provides the means, and a method of operating the same, for transmitting radio waves deep into the earth, and for receiving the waves after their reflection and/or refraction and/or diffraction by various lithologic interfaces and/or mineral deposits or the like. And not only may the depth of such geologic features be determined with the invention, but the features may at times be identified by the characteristic "reflections" arising therefrom.

Experience has shown that the directivity of the herein disclosed transmitting and receiving system is sufficient to meet most practical requirements, but it is to be understood that collinear and/or broadside arrays of electrodes, operated in accordance with the teachings of the instant invention, may be employed to develop horizontal and vertical radiation and reception patterns of almost any desired form, depending on the array configuration, and the electrode spacings, phasings and currents.

In all that has gone before, the electrodes embodied in the invention have been shown at the earth's surface. It is important to understand, however, that the invention may be operated effectively when all of the radiating and/or receiving apparatus, or parts thereof, are placed within the earth. For instance, the said apparatus may readily be operated within a mine by positioning the electrodes in the floor, sides or ceiling of a tunnel, drift or otherwise. By a proper choice of electrode spacing and/or phasing, radio signaling is thus possible between such units spaced within the same mine or different mines, or between units within a mine and one or more units located at the surface of the earth. This application of the invention is of particular significance in exploring for mineral deposits, and in establishing communication in case of mine disasters.

Furthermore, the invention is also operative when the electrodes are inserted in water instead of earth. Such an arrangement of the electrodes leads to an effective system for transmitting and receiving radio waves along the surface of or through bodies of water.

It is to be understood that various modifications may be made in the method hereinbefore disclosed, and in the apparatus referred to for carrying it out, without departing from the spirit of the invention as defined in the following claims.

What is claimed as new and useful is:

1. A method of exploring the earth for a geologic feature, comprising generating radio waves, propagating said waves into the earth through two transmitting electrodes spaced apart therein, adjusting the spherical directivity of said transmitting electrodes until said waves are propagated downward into the earth and onto a geologic feature and thence to two receiving electrodes imbedded in the earth and spaced apart from said transmitting electrodes, and adjusting the spherical directivity of said receiving electrodes until the currents induced therein by the waves arriving from said geologic feature are detected by a receiver which is energized by said receiving electrodes, whereby the character of the currents detected by said receiver is indicative of said geologic feature.

2. A method of exploring the earth for a geologic feature, comprising generating radio waves, propagating said waves into the earth through two transmitting electrodes spaced apart therein, adjusting the spherical directivity of said transmitting electrodes until surface waves are propagated along the ground in a manner adapted to simultaneously and progressively refract some of said waves into the earth and downward along multiple substantially parallel paths onto a geologic feature and thence back to said ground where they recombine with said surface waves and arrive at two receiving electrodes imbedded in the earth and spaced apart from said transmitting electrodes, and adjusting the spherical directivity of said receiving electrodes until the currents flowing therein are detected by a receiver which is energized by said receiving electrodes, whereby the character of the currents detected by said receiver is indicative of said geologic feature.

3. A method of radio signaling, comprising generating radio waves, propagating said waves into the earth through two electrodes spaced apart therein, maintaining constant the phase between the currents or voltages supplied said electrodes while adjusting the spacing between said electrodes until the direction of maximum propagation is toward a receiving means which is separated from said electrodes.

4. A method of radio signaling, comprising generating radio waves, propagating said waves into the earth through two electrodes spaced apart therein, maintaining constant the separation of said electrodes while varying the phase between the currents or voltages supplied said electrodes until the direction of maximum propagation is toward a receiving means which is separated from said electrodes.

5. A method of radio signaling, comprising generating radio waves, propagating said waves into the earth through two electrodes spaced apart therein, varying the spacing between said electrodes and varying the phase between the currents or voltages supplied said electrodes until the direction of maximum propagation is toward a receiving means which is separated from said electrodes.

6. In a method of radio signaling, the steps of receiving radio waves from the ground through two electrodes spaced apart in the earth and separated from the source of said waves, and maintaining constant the phase between the currents or voltages received from said electrodes while adjusting the spacing between said electrodes until the currents flowing through said electrodes are detected by a receiver which is energized by said electrodes.

7. In a method of radio signaling, the steps of receiving radio waves from the ground through two electrodes spaced apart in the earth and separated from the source of said waves, and maintaining constant the separation of said electrodes while varying the phase between the currents or voltages received from said electrodes until the currents flowing through said electrodes are detected by a receiver which is energized by said electrodes.

8. In a method of radio signaling, the steps of receiving radio waves from the ground through two electrodes spaced apart in the earth and separated from the source of said waves, varying the spacing between said electrodes and varying the phase between the currents or voltages received from said electrodes until the currents flowing through said electrodes are detected by a receiver energized by said electrodes.

9. In a system for radio signaling, an apparatus comprising two electrodes spaced apart in a partially conducting wave-propagating medium, a translation device, an electric circuit connecting said translation device with said electrodes, means for tuning said electric circuit to the operating frequency, and a phase shifter for varying the phase between the currents flowing to or from said electrodes to control the direction of maximum propagation or reception.

References Cited in the file of this patent

UNITED STATES PATENTS

| | | |
|---|---|---|
| 1,101,914 | Fessenden | June 30, 1914 |
| 1,173,957 | Hahnemann | Feb. 29, 1916 |
| 1,381,089 | Beverage | June 7, 1921 |
| 1,429,240 | Hanson et al. | Sept. 19, 1922 |
| 1,530,129 | Loftin | Mar. 17, 1925 |
| 1,838,371 | Deardorff | Dec. 29, 1931 |
| 1,919,917 | Truman | July 25, 1933 |
| 2,172,688 | Barret | Sept. 12, 1939 |
| 2,196,187 | Blair | Apr. 9, 1940 |
| 2,239,775 | Bruce | Apr. 29, 1941 |
| 2,293,024 | Klipsch | Aug. 11, 1942 |
| 2,343,140 | Evjen | Feb. 29, 1944 |
| 2,375,778 | Evjen | May 15, 1945 |
| 2,426,918 | Barret | Sept. 2, 1947 |
| 2,499,195 | McNiven | Feb. 28, 1950 |
| 2,527,559 | Linblad | Oct. 31, 1950 |
| 2,535,666 | Broding | Dec. 26, 1950 |
| 2,585,907 | Barret | Feb. 19, 1952 |
| 2,659,882 | Barret | Nov. 17, 1953 |
| 2,661,466 | Barret | Dec. 1, 1953 |